United States Patent
Osler et al.

(10) Patent No.: US 6,553,489 B1
(45) Date of Patent: Apr. 22, 2003

(54) SYSTEM AND METHOD FOR SECURE AND EFFICIENT UNIVERSAL PORT CONFIGURATION

(75) Inventors: Bruce P. Osler, Hudson, NH (US); Luis A. Viriato, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/483,049

(22) Filed: Jan. 12, 2000

(51) Int. Cl.[7] ............................................. G06F 15/177
(52) U.S. Cl. ............................................. 713/1; 710/10
(58) Field of Search ............................ 713/1, 2, 100; 709/220, 221, 222; 710/8, 10

(56) References Cited

U.S. PATENT DOCUMENTS

| | | | |
|---|---|---|---|
| 4,751,634 A | * | 6/1988 | Burrus, Jr. et al. ............ 710/63 |
| 5,922,056 A | * | 7/1999 | Amell et al. .................. 710/16 |
| 6,266,797 B1 | * | 7/2001 | Godfrey et al. ................ 716/1 |
| 6,449,715 B1 | * | 9/2002 | Krivoshein ..................... 713/1 |

* cited by examiner

*Primary Examiner*—Dennis M. Butler
(74) *Attorney, Agent, or Firm*—Sierra Patent Group, Ltd.

(57) ABSTRACT

A system and method for providing secure and efficient configuration of port devices. The system identifies a user of the system and associates the identified user with a particular account group. Each account group is associated with one of a plurality of service templates maintained within each port device or group of port devices. Messages via a control or administration path are used to select the service template associated with the user. The selected service template is then used to configure the port device according the configuration parameters defined for the template according to the user's account group. A separate data path is provided for communicating port data and providing port services once the port has been configured according to the service template. By separating the control path for administrative configuration from the data path for port services, the security of the configuration of the port devices is thereby significantly increased.

19 Claims, 2 Drawing Sheets

SYSTEM AND METHOD FOR SECURE AND EFFICIENT UNIVERSAL PORT CONFIGURATION

BACKGROUND OF THE INVENTION

1. Field of the Invention

This invention pertains generally to network access servers. More particularly, the invention is a system and method for providing secure and efficient configuration of port devices.

2. The Prior Art

Server modems for providing telecommunication services are known in the art. For example, systems having server modems connected to a network access server are used to provide customers with access to a particular network (or group of networks) connected to the network access server. A customer typically connects to the system via a conventional telephone connection. The server modems provide modem services allowing the user to communicate with the network access server via the telephone connection. The network access server provides services which allow the user to access the network via the modem services provided by the corresponding server modem.

Current methods for configuring server modems involve issuing "AT" command strings (also known as the Hayes Standard AT Command Set) from the network access server to the corresponding server modem. AT modem command strings provide various instructions to the server modem including configuration commands such as the baud rate for communication and whether error-correction is enabled, for example. In operation, modem command strings are stored on the network access server and are completely sent to the modem at the beginning and/or the end of each customer session. The modem command strings are received and interpreted by the server modem which then configures modem services according to the configuration parameters defined in the AT modem command string.

According to the server modem configuration method described above, initialization delays result from the transmission and interpretation of the AT command strings. During these initialization delays while the server modem is configured, the modem is temporarily unavailable for the next call to provide the modem services for the customer.

To avoid these initialization delays, some administrators program or otherwise configure the network access servers to use a single modem configuration (i.e., a single AT command string) once during system initialization, rather than issuing a new modem configuration command for each customer session. Alternatively, some administrators do not issue modem configuration commands at all, but rather simply use the factory default settings of the modem. Under either arrangement, the initialization delays associated with an AT command string configuration for each customer session can be avoided.

However, there are several disadvantages associated with not providing a modem command string for each customer session. First, by providing a single configuration setting or by using the modem default configuration setting, the network access server is unable to provide specific settings associated with the particular customer accessing the system. Instead, a single or static configuration setting is used, and thus the session is not tailored to the customer's specific capabilities or needs. Second, administrators that do not use modem configuration commands for each customer session are vulnerable to security attacks and/or are exposed to unintentional configuration corruption. This vulnerability arises because standard AT commands can be used to corrupt the server modem configuration by a user "reverse telnetting" to a particular port on the network access server as is known in the art. In this way, all users dialing into or out of the "corrupted" modem could then experience problems.

Network access server may also be coupled to universal port devices to provide additional port services to customers. As is known in the art, universal port devices may provide one or more port services including, for example, V.110, modem and FAX services, among others. Similar to traditional systems having a network access server connected to server modems as described above, the configuration settings for configuring universal port devices are stored in the network access server and are communicated to the universal port for configuration therein at the appropriate time, normally during the start and/or end of a customer session. Initialization delays associated with configuring universal ports result in the unavailability of the universal port for the next user as in the case of server modems described above. Additionally, the vulnerability to attack and/or unintentional configuration corruption also exists with universal ports where the configuration commands are stored and transmitted from the network access server as is known in the art. This vulnerability generally arises because the user is able to provide "administration" level configuration where configuration commands are issued from the network access server.

Accordingly, there is a need for a system and method which provides for secure and efficient modem and universal port configuration. The present invention satisfies these needs, as well as others, and generally overcomes the deficiencies found in the background art.

An object of the invention is to provide a system and method for configuring universal port devices which overcome the deficiencies of the prior art.

Another object of the invention is to provide a system and method for secure and efficient configuration of modems and universal port devices.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE INVENTION

The present invention is a system and method for providing secure and efficient configuration of port devices including server modems and universal port devices, for example. The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

The system identifies a user of the system and associates the identified user with a particular account group. Each account group is associated with one of a plurality of service templates maintained within each port device or group of port devices. Messages via a control or administration path are used to select the service template associated with the user. The selected service template is then used to configure the port device according the configuration parameters defined for the template according to the user's account group. A separate data path is provided for communicating port data and providing port services once the port has been configured according to the service template. By separating the control path for administrative configuration from the data path for port services, the security of the configuration of the port devices is thereby increased. Furthermore, since the configuration data for the port device is maintained locally within the service templates in the port devices, the normal initialization delays associated with port device configuration are thereby reduced. Certain "non-restricted" configuration commands such as "AT" commands can be send via the data path. The control path can be used for all configuration commands, restricted or non-restricted. Restricted configuration commands, for example, may be limited to commands related to the service templates.

According to a first embodiment, the system of the present invention comprises a network access server (NAS) having an operating system executing therein; a universal port controller (UPC) operatively coupled to the NAS via a first data path carrying data information and a second control path carrying "restricted" administrative control information; a service processing element (SPE) executing within the UPC to provide at least one port service via the data path; and a plurality of service templates, each having universal port configuration information. The service templates reside within said universal port controller and are selectable by the operating system via the control path.

According to another embodiment, the method of the present invention comprises providing a data path between a network access server and a universal port controller; providing a control path between the network access server and the universal port controller; communicating restricted configuration commands via the control path; and communicating user data via the data path.

According to yet another embodiment, the method of the present invention further comprises defining a plurality of service templates, each having port configuration parameters, said service templates residing within said universal port controller; identifying a user accessing said network access server; associating said user with one of said service templates; and configuring port services for said user in said universal port controller according to said service template associated with said user.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
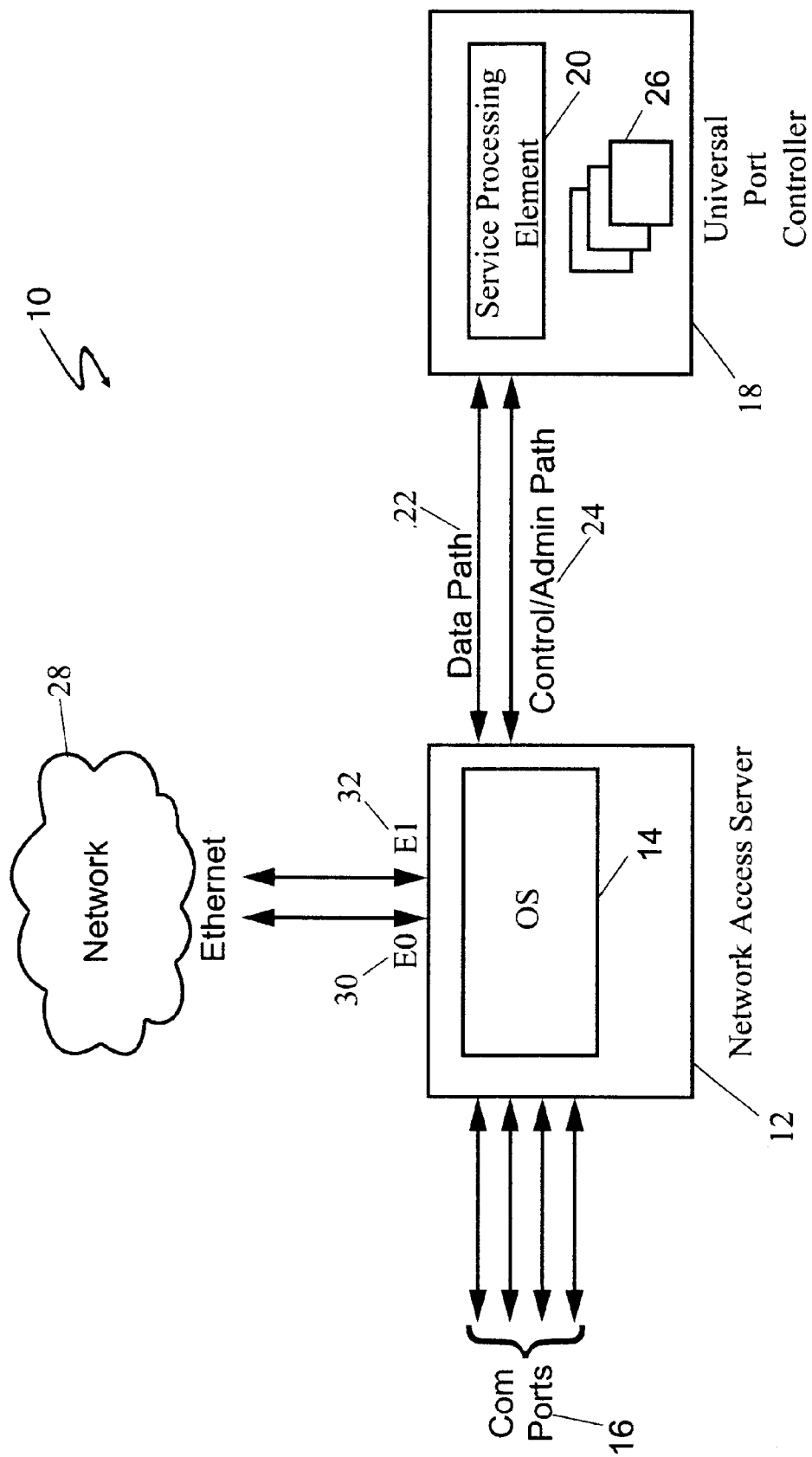
FIG. 1 is a functional block diagram generally depicting a system for providing and configuring port services in accordance with the present invention.
Figure 2:
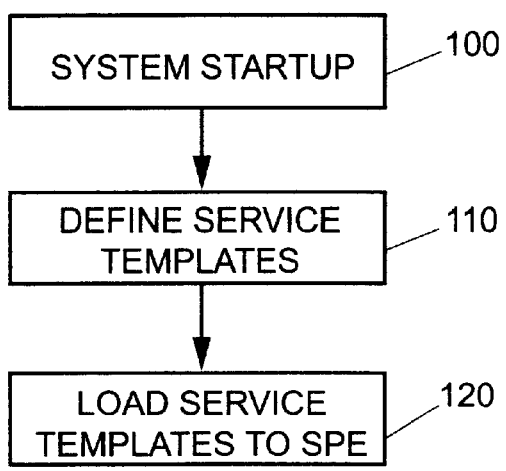
FIG. 2 is a flow chart generally depicting the acts associated with initializing the system in accordance with the present invention.
Figure 3:
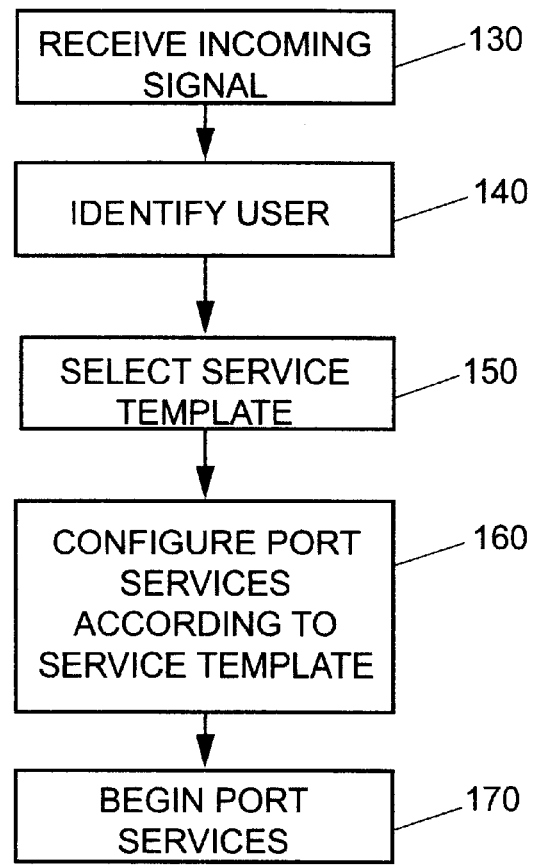
FIG. 3 is a flow chart generally depicting the acts associated with configuring port services in accordance with the present invention.

Referring more specifically to the drawings, for illustrative purposes the present invention is embodied in the apparatus shown FIG. 1 and the method outlined in FIG. 2 and FIG. 3. It will be appreciated that the apparatus may vary as to configuration and as to details of the parts, and that the method may vary as to details and the order of the acts, without departing from the basic concepts as disclosed herein. The invention is disclosed generally in terms of network access server in conjunction with universal port controllers, although numerous other uses for the invention will suggest themselves to persons of ordinary skill in the art.

Referring first to FIG. 1, there is generally shown a system 10 for providing and configuring port services in accordance with the invention. The system 10 comprises a network access server (NAS) 12, which can be any data processing means or computer. Thus, NAS 12 commonly includes a processor (not shown) for executing instructions and a memory (not shown) for working storage as is known in the art. In the present illustrative embodiment, the NAS 12 is a router device which carries out the operation of providing network access to one or more networks or group of networks. For example, the NAS 12 may be used to provide access to the global information network, known as the Internet, or to a corporate private network, for example.

The NAS 12 includes an operating system (OS) 14 executing therein. The OS 14 provides, among other things, the various routing tasks for the NAS 12. In the present invention, the OS 14 is further configured to communicate via one or more communication port connections (com ports) 16. For example, the OS 14 may provide signaling services to receive and/or transmit information over the PSTN (public switch telephone network) via corn ports 16. The OS 14 may also provide signaling services to communicate using ISDN (integrated services digital network), DSL (digital subscriber line), T1 (trunk level 1), or other appropriate telecommunication network via corn ports 16 according to the particular configuration of corn ports 16 as is known in the art.

The system 10 further includes one or more universal port controllers (UPC) 18 operatively coupled for communication with the NAS 12. The UPC 18 may be any universal port controller known in the art for providing port services for communication of V.110, modem, facsimile, HDLC (High-level Data Link Control), Voice over IP, among others. For example, a DSP (digital signaling processor) providing V.110, modem and facsimile services may be used as UPC 18. While the present illustrative embodiment is shown using UPC 18, it will be apparent to those skilled in the art that the invention may also be carried out using server modems, DSPs, or other port devices as the UPC 18. Additionally, it will be appreciated that the NAS 12 may be coupled to more than one UPC device to carry out the present invention. The present system 10 depicting a NAS 12 coupled to a single UPC 18 is for illustrative purposes only.

The UPC 18 includes a service processing element (SPE) 20 executing therein. The SPE 20 is software and hardware configured to provide the port services described above for UPC 18. In this way, the SPE 20 is configured to provide the port services for V.100, modem, facsimile, and other communications supported by the UPC 18 for one or more ports.

The NAS 12 communicates with the UPC 18 via a first data path 22 and a second control or administrative path 24.

The data path 22 is used for exchanging data and providing the port services to a user of the system 10. For example, when a user dials into the system 10 via one of the corn ports 16, the UPC 18 provides port services to the user via data path 22. In this way, PCM (pulse code modulation) signal from corn port 16 is communicated from the NAS 12 to the UPC 18 via data path 22 for processing. The UPC 18 converts the PCM signal. to digital data and communicates the converted digital data to the NAS 12 via data path 22 for further processing therein.

The control path 24 is used for exchanging administrative messages between the NAS 12 and the UPC 18. More particularly and as described in further detail below, the control path 24 is used for selecting and configuring the ports services provided by the UPC 18.

A plurality of service templates 26 are also provided in the UPC 18. Each of service templates 26 includes port service configuration information. The SPE 20 uses the configuration information provided in the service templates 26 to configure the port services provided to the user via data path 22. For example, the configuration information in the service templates 26 may include the type of service to be provided (i.e., V.100, modem, facsimile, HDLC, voice over IP, etc.) and/or the configuration of such service such as the data rate, error correction, among other port configuration settings known in the art. The service templates 26 may be defined during the initialization of system 10 or the initialization of UPC 18 and are normally loaded to the UPC 18 once during the initialization process. Once the service templates 26 are loaded to the UPC 18, the configuration information may be referenced by the NAS 12 via control path 24 and accessed by the SPE 20 for configuration of the port service within the UPC 18.

The OS 14 of NAS 12 is further configured to ascertain the identity of users accessing com ports 16. The OS 14 may use one of the conventionally known ways for identifying users accessing com ports 16. More particularly, in the present illustrative embodiment, the OS 14 identifies the user from the number that is dialed by the user, wherein the number is extracted from DNIS (Dialed Number Identification Service) information provided by the particular telecommunication network system attached to the com port used by the user.

Each such number extracted from the DNIS information identifies the user accessing a particular com port from com ports 16. Each identified user is then associated with one of a plurality of customer account groups by the OS 14. Each customer account group is in turn associated with one of the service templates 26 in UPC 18. Thus, for a particular user accessing a particular com port of the NAS 12, a corresponding service template is selected in the UPC 18 to provide the appropriate port service and port configuration according to the user's account information.

The OS 14 selects the corresponding service template 26 from UPC 18 via a message command indicated via control path 24. Unlike prior art methods, where the configuration data for the port service is communicated along the data path, the OS 14 of the present invention selects the appropriate service template 26 along the secure control path 24, separate from the data path 22. With this arrangement, selection of the appropriate service template (and thus the configuration of the port service) is carried out at an "administrative" level rather than at a user level using AT commands. Additionally, the message command provided by the OS 14 to the UPC 18 for selection of the appropriate service template does not comprise a plurality of configuration parameters for the UPC 18 as is done in the prior art. Rather, the message command is preferably a service template index (such as "ST0" for "service template 0") to identify which service templates is to be used. Since the configuration parameter information is wholly contained in the service template 26, rather than in the message command, the initialization and configuration delays associated with prior methods which communicate the entire configuration parameters in the message command are thereby significantly reduced.

As noted above, the SPE 20 is configured to provide the port services of UPC 18 via data path 22. To this end, the SPE 20 receives the service template index message from the OS 14 via control path 24. Each service template index identifies the appropriate service template 26 used for configuring the port service. The SPE 20 then configures the port service specified in the identified service template 26 and according to the configuration parameters defined in the service template 26. The UPC 18 then carries out port services to the user via data path 22. The NAS 12 then provides routing services to the user as is known in the art. For example, the NAS 12 may provide the user access to a network 28 connected to Ethernet ports E0 32 and E1 34 interfaced with the NAS 12.

The method and operation of invention will be more fully understood with reference to the flow charts of FIG. 2 and FIG. 3, as well as FIG. 1. FIG. 2 is a flow chart generally depicting the acts associated with initializing the system in accordance with the present invention. FIG. 3 is a flow chart generally depicting the acts associated with configuring port services in accordance with the present invention. The order of actions as shown in FIG. 2 and FIG. 3 and described below is only exemplary, and should not be considered limiting.

At box 100 of FIG. 2, the system 10 is started or initialized as is known in the art. This process generally involves checking various hardware components of the system 10, including checking the memory and processor of the NAS 12, for example. Initialization also involves loading various software elements of the system 10, including loading the OS 14 on the NAS and the SPE 20 on the UPC 18. Communication protocols are also established including the Ethernet connection between the NAS 12 and the Network 28. The data path 22 and the control path 24 between the NAS 12 and the Network 28 are also established. Box 110 is then carried out.

At box 110, the service templates 26 are defined. According to the invention, the service templates 26 include port configuration parameters which are used by the SPE 20 to configure port services within the UPC 18. The configuration parameters in the service templates 26 may be defined by the OS 14 according to the capabilities of the UPC 18 and/or the customer account groups. Additionally, each service template 26 will be assigned a service template index (such as "ST0" for "service template 0") which may be referenced by the OS 14. Box 120 is then carried out.

At box 120, the service templates 26 defined in box 110 are loaded to the UPC 18. Thus according to the present arrangement, the service templates 26 are loaded to the UPC 18 once, during this initialization sequence. As noted above, the service templates 26 are reference by OS 14 using a service template index via control path 24. The AT command strings and other similar configuration codes normally communicated between the NAS and the UPC in the prior art are thus avoided.

Referring now to FIG. 3, the acts associated with configuring port services in accordance with the present invention are generally shown.

At box 130, the NAS 12 receives an incoming signal via one of the corn ports 16 from a user of the system 10. By way of example, the user may be dialing into the system 10 via PSTN using a remote PC and modem (not shown). Another example includes a user dialing into the system 10 via an ISDN service using a remote PC and an ISDN terminal adapter. Various other arrangements wherein a user dials into system 10 may also be carried out during box 130. Box 140 is then carried out.

At box 140, the OS 14 identifies the user dialing into the system 10 from box 130. As noted above, various means for identifying the user may be used with the present invention. In the preferred embodiment, the OS 14 identifies the user by identifying the number which is dialed by the user. For example, the number dialed by the user may be ascertained from the DNIS information provided by the telecommunication service. Box 150 is then carried out.

At box 150, the user identified in box 140 is then associated with a particular customer account group. Each account group is, in turn, associated with specific port services and configuration. More particularly, each account group is associated with a service template index which corresponds to specific port services and configuration. The OS 14 then communicates a message (including the service port index associated with the user) to the SPE 20 via control path 24 to provide port services according to the service template index associated with the present user. Box 160 is then carried out.

At box 160, the SPE 20 receives the service port index issued in box 150. In response to this signal, the SPE 20 ascertains the port services and configuration parameters in the service template 26 associated with the service port index referenced by OS 14 and configures port services according to the configuration parameters specified in the service template 26. Box 170 is then carried out.

At box 170, the port services configured in box 160 are provided to the user via data path 22. In this way, PCM data communicated via corn port 16 is routed from NAS 12 to UPC 18 via data path 22. The SPE 20 operating in the UPC 18 provides the port services to convert the PCM data to digital data. The converted digital data is then communicated to NAS 12 via data path 22 for further processing. As is known in the art, the OS 14 provides further routing services to communicate with network 28 accordingly. It is noted that configuration and administration of UPC 18 and SPE 20 are isolated via control path 24 which is unavailable to the end user dialing into the system 10, and data communication is isolated along data path 22 wherein the user is unable to provide restricted configuration of UPC 18 and SPE 20. As noted above, certain "non-restricted" configuration commands such as "AT" commands can be send via the data path. The control path can be used for all configuration commands, restricted or non-restricted (such as "AT" commands). Restricted configuration commands, for example, may be limited to commands related to the service templates.

Accordingly, it will be seen that this invention provides a system and method for providing secure and efficient configuration of port devices. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. In a system having a network access server with an operating system executing therein, a universal port controller for providing port services comprising:

a) a service processing element executing within said universal port controller to provide at least one port service to a user of the network access server;

b) a plurality of service templates, each having universal port configuration information, said service templates residing within said universal port controller;

c) a data path carrying data information between said universal port controller and the network access server; and d) a control path carrying administrative control information between said universal port controller and the network access server, said service templates selectable via said control path.

2. The universal port controller of claim 1, wherein said operating system is further configured to select one of said service templates via said control path according to account information for a user of the system.

3. The universal port controller of claim 2, wherein said service processing element is further configured to configure port services according to configuration information provided in said service template selected by said operating system.

4. The universal port controller of claim 1, where said data path is further configured to transmit non-restricted "AT" configuration commands.

5. The universal port controller of claim 1, where said control path is further configured to transmit non-restricted "AT" configuration commands.

6. In a system having a network access server coupled to at least one universal port controller, a method for configuring port services in said universal port controller comprising:

a) providing a data path between said network access server and said universal port controller;

b) providing a control path between said network access server and said universal port controller;

c) communicating restricted configuration commands via said control path; and d) communicating user data via said data path.

7. The method of claim 6 further comprising communicating non-restricted configuration commands via said data path.

8. The method of claim 6 further comprising defining a plurality of service templates, each having port configuration parameters, said service templates residing within said universal port controller.

9. The method of claim 8 further comprising:

a) identifying a user accessing said network access server;

b) associating said user with one of said service templates; and c) configuring port services for said user in said universal port controller according to said service template associated with said user.

10. The method of claim 9 wherein said identifying a user comprises identifying phone number dialed by said user.

11. The method of claim 10 wherein each said service template is associated with a service template index.

12. The method of claim 11 further comprising:

a) identifying a user accessing said network access server;

b) associating said user with a said service template index;

c) communicating, by an operating system, a message including said associated service template index to a service processing element;

d) ascertaining, by said service processing element, port configuration parameters from said service template index; and e) configuring, by said service processing element, port services according to said port configuration parameters.

13. A program storage device readable by a machine, tangibly embodying a program of instructions executable by the machine to perform a method for configuring port services in a system having a network access server coupled to at least one universal port controller, said method comprising:
   a) providing a data path between said network access server and said universal port controller;
   b) providing a control path between said network access server and said universal port controller;
   c) communicating restricted configuration commands via said control path; and
   d) communicating user data via said data path.

14. The program storage device of claim 13, said method further comprising communicating non-restricted "AT" configuration commands via said data path.

15. The program storage device of claim 13, said method further comprising defining a plurality of service templates, each having port configuration parameters, said service templates residing within said universal port controller.

16. The program storage device of claim 15, said method further comprising:
   a) identifying a user accessing said network access server;
   b) associating said user with one of said service templates; and
   c) configuring port services for said user in said universal port controller according to said service template associated with said user.

17. The program storage device of claim 16, wherein said identifying a user comprises identifying phone number dialed by said user.

18. The program storage device of claim 15, wherein each said service template is associated with a service template index.

19. The program storage device of claim 18, said method further comprising:
   a) identifying a user accessing said network access server;
   b) associating said user with a said service template index;
   c) communicating, by said operating system, a message including said associated service template index to said service processing element;
   d) ascertaining, by said service processing element, port configuration parameters from said service template index; and
   e) configuring, by said service processing element, port services according to said port configuration parameters.

* * * * *